US011236983B2

(12) United States Patent
Patrangenaru

(10) Patent No.: US 11,236,983 B2
(45) Date of Patent: Feb. 1, 2022

(54) MEASURING TAPE WITH VARIABLE MASS ALONG TAPE LENGTH

(71) Applicant: APEX BRANDS, INC., Apex, NC (US)

(72) Inventor: Vlad Petru Patrangenaru, Ellicott City, MD (US)

(73) Assignee: Apex Brands, Inc., Apex, NC (US)

( * ) Notice: Subject to any disclaimer, the term of this patent is extended or adjusted under 35 U.S.C. 154(b) by 104 days.

(21) Appl. No.: 16/639,430

(22) PCT Filed: Aug. 16, 2018

(86) PCT No.: PCT/IB2018/056163
§ 371 (c)(1),
(2) Date: Feb. 14, 2020

(87) PCT Pub. No.: WO2019/035026
PCT Pub. Date: Feb. 21, 2019

(65) Prior Publication Data
US 2021/0131780 A1    May 6, 2021

Related U.S. Application Data

(60) Provisional application No. 62/546,142, filed on Aug. 16, 2017.

(51) Int. Cl.
*G01B 3/10* (2020.01)
*G01B 3/1003* (2020.01)

(52) U.S. Cl.
CPC .... *G01B 3/1003* (2020.01); *G01B 2003/1058* (2013.01)

(58) Field of Classification Search
CPC ..................................... G01B 3/1003
USPC ..................................... 33/755, 771
See application file for complete search history.

(56) References Cited

U.S. PATENT DOCUMENTS

| RE23,133 | E | * | 7/1949 | Keuffel et al. | ....... | G01B 3/1003 33/771 |
| 2,658,006 | A | * | 11/1953 | Beeber | ................. | G01B 3/1003 148/273 |
| 3,032,151 | A | * | 5/1962 | Allen | ..................... | E06B 9/386 52/108 |

(Continued)

FOREIGN PATENT DOCUMENTS

DE        2844021 A1    4/1980

OTHER PUBLICATIONS

International Search Report and Written Opinion of the International Searching Authority dated Oct. 22, 2018, for PCT/IB2018/056163, all enclosed pages cited.

*Primary Examiner* — George B Bennett
(74) *Attorney, Agent, or Firm* — Burr & Forman, LLP

(57) ABSTRACT

A method of producing a measuring tape may include providing a tape measure blade having a first end configured to extend from a housing and a second end configured to be wound on a reel assembly, defining a first non-critical region from the first end to a start of a critical region, defining a second non-critical region from the second end to an end of the critical region, and modifying a mass per unit length of a portion of the blade such that a mass per unit length of the first and second non-critical regions is less than a mass per unit length of the critical region.

20 Claims, 4 Drawing Sheets

(56) References Cited

U.S. PATENT DOCUMENTS

| | | | | |
|---|---|---|---|---|
| 4,411,072 A | * | 10/1983 | Rutty | G01B 3/1003 33/757 |
| 7,062,862 B2 | * | 6/2006 | Wheaton | G01B 3/1003 33/757 |
| 7,856,735 B2 | * | 12/2010 | Allezy | B32B 27/36 33/771 |
| 8,141,266 B2 | * | 3/2012 | Sun | G01B 3/04 33/755 |
| 10,989,512 B2 | * | 4/2021 | McKenzie | B24C 1/10 |
| 2005/0138829 A1 | | 6/2005 | Critelli et al. | |
| 2015/0247716 A1 | | 9/2015 | Craig et al. | |

* cited by examiner

MEASURING TAPE WITH VARIABLE MASS ALONG TAPE LENGTH

CROSS REFERENCE TO RELATED APPLICATIONS

This application claims priority to U.S. application No. 62/546,142 filed Aug. 16, 2017, the entire contents of which are hereby incorporated by reference in its entirety.

TECHNICAL FIELD

Example embodiments generally relate to measuring tape devices, and particularly relate to a measuring tape that has a variable mass along its length.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For nearly a century, metallic tape ribbons with a curved and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. By employing an end hook at one end of the tape, the user may take advantage of the standout to pay out the measuring tape toward an anchor point on a media that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature.

Invariably, each measuring tape will have a certain length that effectively defines the maximum standout that can be achieved before the tape bends and effectively collapses. The measuring tape can no longer be extended reliably toward the anchor point once this collapse occurs. However, many users would prefer to reattempt to reach the anchor point, sometimes numerous times, than to physically move to the anchor point and attach the end hook to the anchor point. Thus, having a superior standout could be a powerfully attractive feature for a measuring tape.

BRIEF SUMMARY OF SOME EXAMPLES

Some example embodiments may enable the provision of a longer than normal standout for a measuring tape by reinforcing a segment of a blade portion of the measuring tape over a critical region. The rigidity of the measuring tape may also be improved. Thus, for example, user experience associated with use of the measuring tape may be improved.

In an example embodiment, a measuring tape device is provided. The device may include a housing having an aperture, a reel assembly, and a blade having a first end configured to extend from the housing through the aperture and a second end configured to be wound on the reel assembly. The blade may include a first non-critical region from the first end to a start of a critical region, and a second non-critical region extending from the second end to an end of the critical region. A mass per unit length of a portion of the blade may be modified such that a mass per unit length of the first and second non-critical regions is less than a mass per unit length of the critical region.

In another example embodiment, a method of producing a measuring tape is provided. The method may include providing a tape measure blade having a first end configured to extend from a housing and a second end configured to be wound on a reel assembly, defining a first non-critical region from the first end to a start of a critical region, defining a second non-critical region from the second end to an end of the critical region, and modifying a mass per unit length of a portion of the blade such that a mass per unit length of the first and second non-critical regions is less than a mass per unit length of the critical region.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
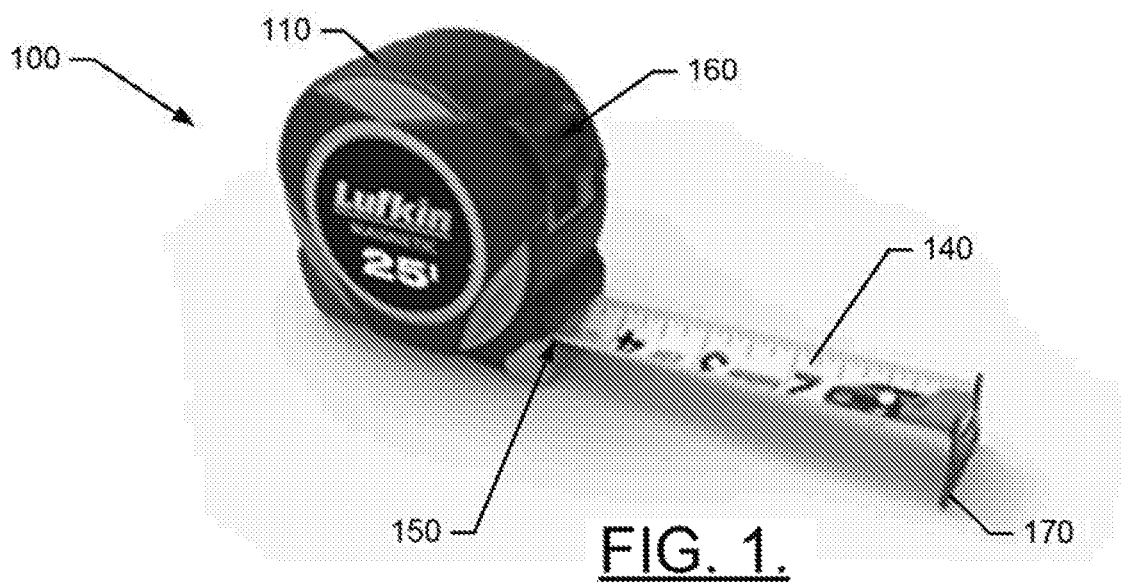
FIG. 1 illustrates a perspective view of a measuring tape device in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a measuring tape device that may have an improved blade standout. This is accomplished by employing a reinforced segment of the blade at a critical region or zone. FIG. 1 illustrates a perspective view of a measuring tape device, and FIG. 2 illustrates a block diagram of such device, in accordance with an example embodiment.

Figure 2:
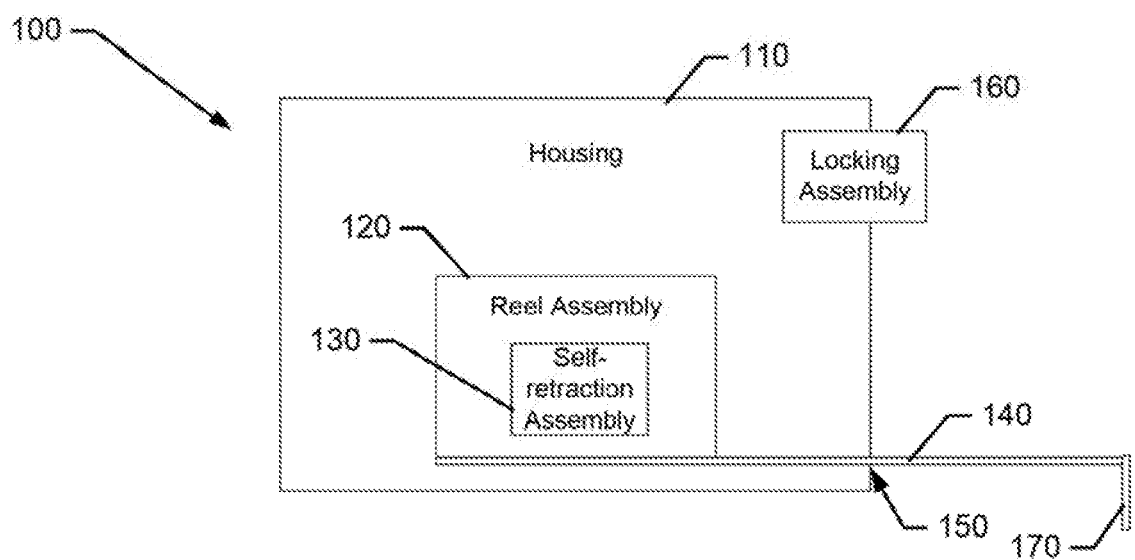
FIG. 2 illustrates a block diagram of the measuring tape device in accordance with an example embodiment.

Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 generally occurs at a portion of the blade 140 that can be referred to as a "critical region" since it can occur at slightly different points (but generally in the same region) on different extension operations.

A typical blade is made to have the same width and height, and therefore the same mass, across its entire length. However, it may be possible to increase the standout capabilities of the blade 140 may changing the mass at certain strategic locations along the length of the blade 140. For example, if the mass of the blade 140 is higher within the critical region than the mass outside the critical region, the blade 140 may be able to retain its rigidity and avoid collapsing to achieve greater standout. There may be a number of ways to achieve the capability for greater standout using variable mass strategies. FIGS. 3-8 illustrate some of these examples.

Figure 3:
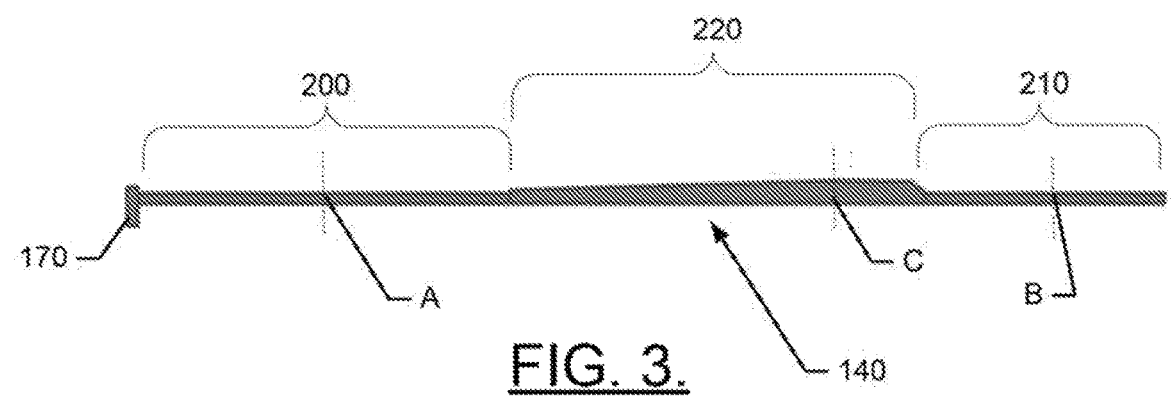
FIG. 3 illustrates a longitudinal cross section view of a blade portion of a measuring tape device in accordance with an example embodiment.
Figure 4:
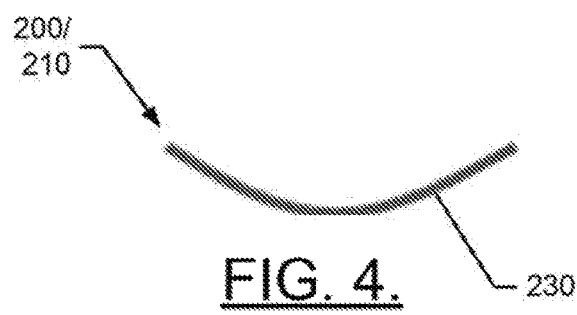
FIG. 4 illustrates a transversal cross section view of the blade portion of the measuring tape device outside a critical region in accordance with an example embodiment.
Figure 5:
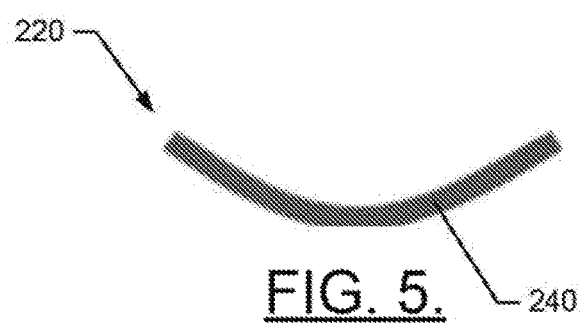
FIG. 5 illustrates a transversal cross section view of the blade portion of the measuring tape device at the critical region in accordance with an example embodiment.
Figure 6:
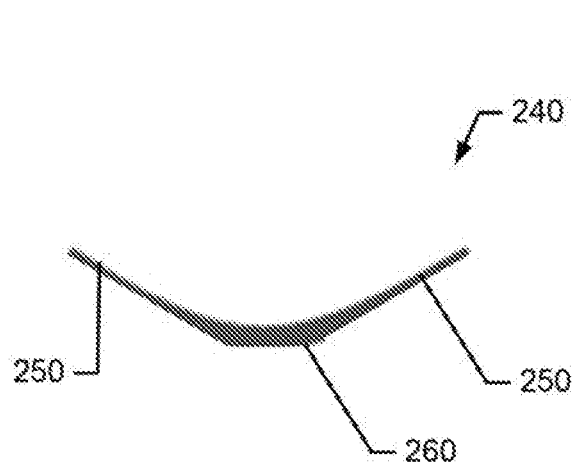
FIG. 6 illustrates a transversal cross section view of the blade portion of an alternative measuring tape device design at a critical region that has a non-uniform thickness within the critical region in accordance with an example embodiment.
Figure 7:
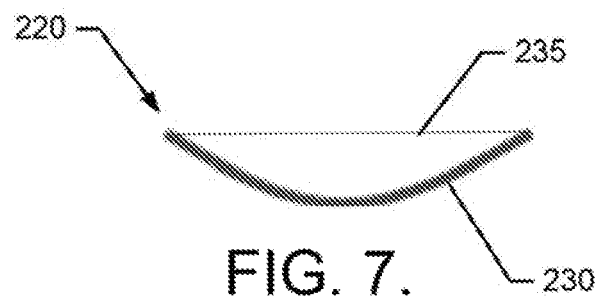
FIG. 7 illustrates a transversal cross section view of the blade portion of the measuring tape device with a reinforcement band provided in the critical region in accordance with an example embodiment.

In this regard, FIG. 3 illustrates a longitudinal cross section view of the blade 140 to facilitate the definition of various regions of the blade 140, and to show one particular example embodiment for improving standout of the blade 140. FIG. 4 illustrates a transversal cross section view of the blade 140 of FIG. 3, taken at either point A or point B of FIG. 3. FIG. 5 illustrates a transversal cross section view of the blade 140 of FIG. 3 taken at point C (i.e., within the critical region) in accordance with one example embodiment. FIG. 6 illustrates a transversal cross section view of an alternative way of achieving increased mass in the critical region by showing an alternate possible cross section at point C of FIG. 3. FIG. 7 illustrates a top view of another alternative design for providing non-uniform masses (particularly in the critical region) along a length of the blade 140 in accordance with an example embodiment.

Referring now to FIGS. 3-8, it can be appreciated that the blade 140 may include a first non-critical region 200 disposed proximate to a first end of the blade 140 and a second non-critical region 210 disposed proximate to a second end of the blade 140. The first end of the blade 140 may extend from the end hook 170 to a start of a critical region 220. The critical region 220 may then extend to meet the second non-critical region 210. The second non-critical region 210 may then extend from the critical region 220 to the second end of the blade 140. Thus, the critical region 220 is disposed between the first and second non-critical regions 200 and 210.

In an example embodiment, a mass per unit length of the blade 140 in the first and second non-critical regions 200 and 210 may be less than the mass per unit length of the blade 140 in the critical region 220. By reducing the mass (and mass per unit length) in the first and second non-critical regions 200 and 210 relative to the mass (and mass per unit length) in the critical region 220, the critical region 220 may be more likely to maintain rigidity and avoid collapse on payout of the blade 140 through the critical region 220. The blade 140 may therefore have a longer standout.

The reduction in mass per unit length of the first and second non-critical regions 200 and 210 relative to the mass per unit length in the critical region 220 can be accomplished in different ways. For example, the mass per unit length in the critical region 220 can be increased relative to the mass per unit length in the first and second non-critical regions 200 and 210. However, as an alternative, the mass per unit length in the first and second non-critical regions 200 and 210 could be reduced relative to the mass per unit length in the critical region 220. FIG. 3 shows an example where the thickness of the blade 140 is increased in the critical region 220 relative to the thickness of the blade 140 in the first and second non-critical regions 200 and 210. In this regard, FIG. 4 illustrates the blade 140 at point A in the first non-critical region 200, and is identical to the blade 140 at point C in the second non-critical region 210. The blade 140 at point A and point C (and throughout the first and second non-critical regions 200 and 210) is formed of a metallic elongate strip 230 having a first thickness. The metallic elongate strip 230 is curved slightly upward at both transverse ends along its length (to form a U-shape). The curvature of the metallic elongate strip 230 improves rigidity and has been a standard feature for many years. However, of note, the standard construction is also of a uniform thickness over the entire length of the blade so that the same mass per unit length is achieved. The uniform thickness is somewhat limited to avoid increasing the weight of the blade and the device itself.

Some example embodiments may add, between the first and second non-critical regions 200 and 210, a reinforced portion 240. The reinforced portion 240 may have a thickness that is greater than the first thickness as shown in FIG. 5, which illustrates a greater thickness at point C than at points A and B. Moreover, in some cases, the thickness of the reinforced portion 240 may change (e.g., increase or decrease) as the distance from the hook end 170 increases. However, the thickness of the reinforced portion 240 could alternatively be constant along the length of the critical region 220 in some cases. FIG. 3 illustrates a case in which the thickness increases as distance from the hook end 170 increases.

In the example illustrated in FIG. 5, the reinforced portion 240 may be formed by uniformly increasing the thickness of the blade 140 in the transverse direction (regardless of whether that thickness changes in the longitudinal direction). Thus, for example, one or more layers of additional material may be provided over all or portions of the reinforced portion 240. Layers may be added in some parts and not in others to change the thickness of the reinforced portion 240 in certain areas, or the layers themselves may have changing thicknesses in certain regions. However, the reinforced portion 240 could alternatively be formed by only increasing the thickness of the blade 140 at a limited portion of the transverse area of the blade 140. For example, as shown in FIG. 6, the blade 140 may be defined by including the first thickness over outside portions 250 of the reinforced portion 240, but an interior portion 260 may have a thickness greater than the first thickness. The thickness of the interior portion 260 may be constant or increase or decrease along the length of the critical region 220. Moreover, the thickness of the blade may be increased at the outside portions 250 and reduced at the interior portion 260. In still other cases, one or more elongate members of any cross sectional shape may be extended along the critical region 220 to provide reinforcement to form the reinforced portion 240.

In the examples of FIGS. 5 and 6, the reinforced portion 240 is formed to extend along the length of the critical region 220 either across the entire transverse area of the blade 140 or over just a portion of the transverse area of the blade 140. However, it is also possible for reinforcement to be provided that does not follow these examples. For example, FIG. 7 illustrates an example in which a reinforcement band 235 is extended between opposing transverse ends of the critical region 220. The reinforcement band 235 may extend over the entire critical region 220 or specific instances may be spaced apart from each other over the critical region 220. The reinforcement band 235 may be clear so that markings can be seen through the reinforcement band 235. Thus, for example, the reinforcement band 235 may be made of a clear elastomer.

Figure 8:
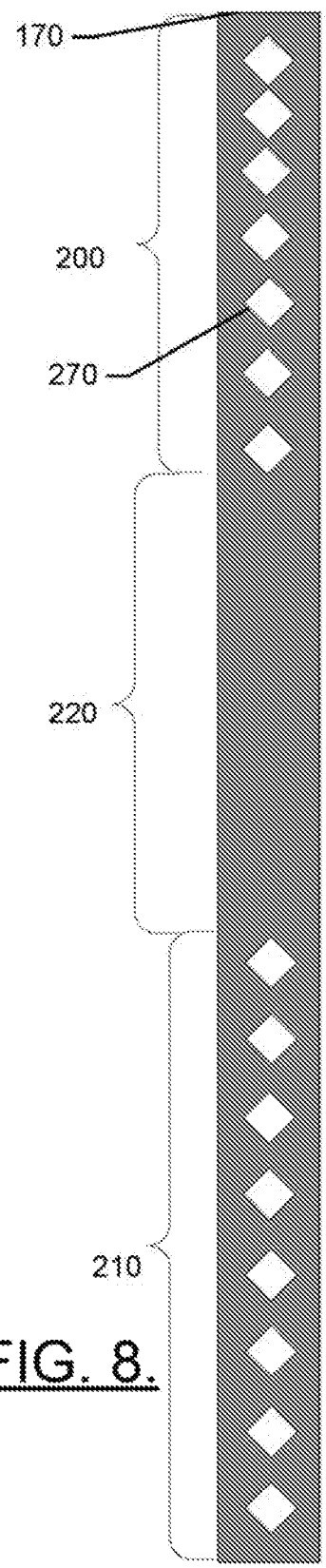
FIG. 8 illustrates a top view of a blade portion of another alternative measuring tape design in accordance with an example embodiment.

As discussed above, FIG. 3 shows how the mass per unit length in the critical region 220 can be increased relative to the mass per unit length in the first and second non-critical regions 200 and 210. However, FIG. 8 illustrates an alternative design in which the mass per unit length in the first and second non-critical regions 200 and 210 could be reduced relative to the mass per unit length in the critical region 220. In this regard, the first and second non-critical regions 200 and 210 may each have their mass per unit length reduced by cutting out portions of the blade 140 in these respective regions. As shown in FIG. 8, cutouts 270 may be formed in the blade 140 in both the first and second non-critical regions 200 and 210.

In the example of FIG. 8, the thickness of the blade 140 in all regions (i.e., in the critical region 220 and the first and second non-critical regions 200 and 210) may be the same. Thus, the only change between the regions may be the reduction of material in the first and second non-critical regions 200 and 210 by formation of the cutouts therein. The cutouts 270 of FIG. 7 are shown to be diamond shaped, but it should be appreciated that any suitable shape may be used in example embodiments (e.g., squares, circles, rectangles, x shapes, etc.). It should also be appreciated that the cutouts 270 can be placed along the longitudinal centerline of the blade 140 (as shown in FIG. 8), or along outer edges (e.g., transverse edges) of the blade 140, or both. In some cases, the cutouts 270 could even be offset from either edge and from the centerline in any desirable pattern or position.

The cutouts 270 may be spaced apart at regular intervals to define a constant mass per unit length for the first and second non-critical regions 200 and 210 that is less than the mass per unit length over the critical region 220 inside which either no (or at least farther spaced apart) cutouts 270 may be located. However, in other cases, the spacing of cutouts 270 in the first and second non-critical regions 200 and 210 may change with position to further change the distribution of weight in corresponding portions of those respective regions. In the example of FIG. 8, the cutouts 270 in the first non-critical region 200 have a density that increases as the first end (and end hook 170) are approached. However, the density of cutouts 270 in the second non-critical region 210 is constant over the entire second non-critical region 210. The density could be maintained constant to provide a uniform mass per unit length over any particular region, or the density can be adjusted to create various lighter and/or heavier regions according to the desired performance characteristics. In some cases, making the first end (i.e., the portion of the blade 140 near the end hook 170) lighter may allow the critical region 200 to be moved farther from the first end since the blade 140 would have less weight near the first end so that the critical region 220 supports less weight.

Figure 9:
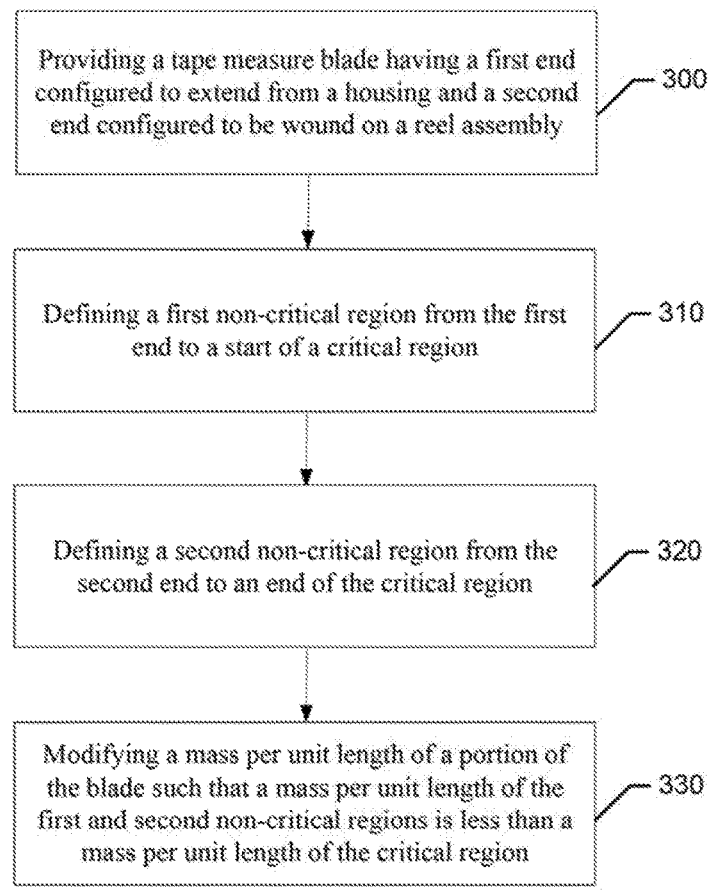
FIG. 9 illustrates a method of making a measuring tape device having an improved blade standout in accordance with an example embodiment.

FIG. 9 illustrates a block diagram for a method of producing a tape measuring device in accordance with an example embodiment. As shown in FIG. 9, the method may include providing a tape measure blade having a first end configured to extend from a housing and a second end configured to be wound on a reel assembly at operation 300. The method may include defining a first non-critical region from the first end to a start of a critical region at operation 310, and defining a second non-critical region from the second end to an end of the critical region at operation 320. The method may further include modifying a mass per unit length of a portion of the blade such that a mass per unit length of the first and second non-critical regions is less than a mass per unit length of the critical region at operation 330.

In some cases, the method (or portions or operations thereof) may be augmented or modified, or additional optional operations may be included. For example, in some cases, modifying the mass per unit length of the portion of the blade may include reducing the mass per unit length in the first and second non-critical regions. In an example embodiment, reducing the mass per unit length in the first and second non-critical regions may include defining cutouts in the first and second non-critical regions. In some cases, the cutouts may be evenly spaced apart over the first and second non-critical regions. In an example embodiment, modifying the mass per unit length of the portion of the blade may include increasing the mass per unit length in the critical region. In some cases, increasing the mass per unit length in the critical region comprises increasing a thickness of the blade in the critical region relative to a thickness of the blade in the first and second non-critical regions. In an example embodiment, increasing the mass per unit length in the critical region comprises adding thickness to the blade in the critical region such that a thickness of the blade increases as distance from the first end increases. In some cases, increasing the mass per unit length in the critical region comprises defining a reinforced portion of the blade in the critical region. In an example embodiment, the reinforced portion may have a uniform thickness in a transverse direction across the blade. However, in other example embodiments, the reinforced portion may have a non-uniform thickness in a transverse direction across the blade.

Example embodiments may therefore increase blade standout. However, since only strategically selected portions of the blade remain heavier than other sections (whether material is added or removed to obtain different weighted portions), the overall weight of the blade and the tape measuring device may not be affected very much by the present invention. As such, a tape measure device that remains relatively light, but which has superior characteristics may be provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of producing a measuring tape, the method comprising:
    providing a tape measure blade having a first end configured to extend from a housing and a second end configured to be wound on a reel assembly;
    defining a first non-critical region from the first end to a start of a critical region;
    defining a second non-critical region from the second end to an end of the critical region; and
    modifying a mass per unit length of a portion of the blade such that a mass per unit length of the first and second non-critical regions is less than a mass per unit length of the critical region,
    wherein the first and second non-critical regions include cutouts formed in the blade to reduce the mass per unit length in the first and second non-critical regions.

2. The method of claim 1, wherein the cutouts are evenly or variably spaced apart over the first and second non-critical regions.

3. The method of claim 1, wherein modifying the mass per unit length of the portion of the blade comprises increasing the mass per unit length in the critical region.

4. The method of claim 3, wherein increasing the mass per unit length in the critical region comprises increasing a thickness of the blade in the critical region relative to a thickness of the blade in the first and second non-critical regions.

5. The method of claim 3, wherein increasing the mass per unit length in the critical region comprises adding thickness to the blade in the critical region such that a thickness of the blade increases as distance from the first end increases.

6. The method of claim 3, wherein increasing the mass per unit length in the critical region comprises defining a reinforced portion of the blade in the critical region.

7. The method of claim 6, wherein the reinforced portion has a uniform thickness in a transverse direction across the blade.

8. The method of claim 6, wherein the reinforced portion has a non-uniform thickness in a transverse direction across the blade.

9. A measuring tape device comprising:
    a housing having an aperture;
    a reel assembly; and
    a blade having a first end configured to extend from the housing through the aperture and a second end configured to be wound on the reel assembly;
    wherein the blade comprises a first non-critical region from the first end to a start of a critical region, and a second non-critical region extending from the second end to an end of the critical region,
    wherein a mass per unit length of a portion of the blade is modified such that a mass per unit length of the first and second non-critical regions is less than a mass per unit length of the critical region, and
    wherein the first and second non-critical regions include cutouts formed in the blade to reduce the mass per unit length in the first and second non-critical regions.

10. The device of claim 9, wherein the cutouts are evenly or non-uniformly spaced apart over the first and second non-critical regions.

11. The device of claim 9, wherein the mass per unit length of the critical region is increased relative to the mass per unit length in the first and second non-critical regions.

12. The device of claim 11, wherein a thickness of the blade in the critical region is increased relative to a thickness of the blade in the first and second non-critical regions.

13. The device of claim 11, wherein thickness is added to the blade in the critical region such that a thickness of the blade increases as distance from the first end increases within the critical region.

14. The device of claim 11, wherein the critical region comprises a reinforced portion of the blade.

15. The device of claim 14, wherein the reinforced portion has a uniform thickness in a transverse direction across the blade.

16. The device of claim 14, wherein the reinforced portion has a non-uniform thickness in a transverse direction across the blade.

17. The method of claim 1, wherein a density of the cutouts increases as distance from the first end decreases in the first non-critical region.

18. The method of claim 1, wherein a density of the cutouts is constant over an entirety of the first non-critical region.

19. The device of claim 9, wherein a density of the cutouts increases as distance from the first end decreases in the first non-critical region.

20. The device of claim 9, wherein a density of the cutouts is constant over an entirety of the first non-critical region.

* * * * *